(12) United States Patent
Yano

(10) Patent No.: US 10,862,537 B2
(45) Date of Patent: Dec. 8, 2020

(54) POWER LINE COMMUNICATION DEVICE, IN-VEHICLE DEVICE AND IN-VEHICLE SYSTEM

(71) Applicant: HITACHI AUTOMOTIVE SYSTEMS, LTD., Hitachinaka (JP)

(72) Inventor: Tomohiko Yano, Tokyo (JP)

(73) Assignee: HITACHI AUTOMOTIVE SYSTEMS, LTD., Ibaraki (JP)

(*) Notice: Subject to any disclaimer, the term of this patent is extended or adjusted under 35 U.S.C. 154(b) by 0 days.

(21) Appl. No.: 16/755,974

(22) PCT Filed: Nov. 1, 2018

(86) PCT No.: PCT/JP2018/040652
§ 371 (c)(1),
(2) Date: Apr. 14, 2020

(87) PCT Pub. No.: WO2019/138664
PCT Pub. Date: Jul. 18, 2019

(65) Prior Publication Data
US 2020/0304172 A1 Sep. 24, 2020

(30) Foreign Application Priority Data
Jan. 12, 2018 (JP) ................................ 2018-003557

(51) Int. Cl.
*H04B 3/54* (2006.01)
(52) U.S. Cl.
CPC ............ *H04B 3/548* (2013.01); *H04B 3/544* (2013.01); *H04B 2203/547* (2013.01); *H04B 2203/5412* (2013.01); *H04B 2203/5416* (2013.01); *H04B 2203/5483* (2013.01); *H04B 2203/5495* (2013.01)

(58) Field of Classification Search
CPC .... H04B 2203/547; H04B 3/54; H04B 3/548; H04B 3/544; H04B 3/58; B60R 16/023; B60R 16/03
See application file for complete search history.

(56) References Cited

U.S. PATENT DOCUMENTS 5,444,378 A * 8/1995 Rogers .................. H02J 7/1461
324/428
2004/0223275 A1* 11/2004 Yanagida ............ H02J 13/0003
361/62

(Continued)

FOREIGN PATENT DOCUMENTS

JP  2011-500137 A  1/2011
JP  2015-157605 A  9/2015

(Continued)

*Primary Examiner* — Khanh C Tran
(74) *Attorney, Agent, or Firm* — Volpe Koenig

(57) ABSTRACT

A power line communication device includes a DC power source device, a power line, and a master station that modulates a supply voltage VBUS supplied to the power line according to transmission data to be transmitted. The master station includes a modulation capacitor that is precharged with a modulation amplitude voltage, a polarity switch unit that determines a polarity of the modulation capacitor connected to the power line according to transmission data, and an inductor connected between the DC power source device and the power line.

15 Claims, 8 Drawing Sheets

(56) References Cited

U.S. PATENT DOCUMENTS

| | | | |
|---|---|---|---|
| 2015/0008734 A1* | 1/2015 | Ishida | F02N 11/0866 307/10.1 |
| 2015/0012175 A1* | 1/2015 | Hara | B60W 10/26 701/36 |
| 2015/0210232 A1* | 7/2015 | Kanzaki | H02H 7/18 701/36 |
| 2015/0244420 A1* | 8/2015 | Matsudaira | H04L 67/1051 375/257 |
| 2016/0374787 A1 | 12/2016 | Forsell | |
| 2017/0111086 A1 | 4/2017 | Choi et al. | |
| 2017/0317718 A1 | 11/2017 | Yamamoto et al. | |
| 2019/0308573 A1* | 10/2019 | Itou | B60L 50/50 |

FOREIGN PATENT DOCUMENTS

| | | |
|---|---|---|
| JP | 2017-507625 A | 3/2017 |
| JP | 2017-201778 A | 11/2017 |

\* cited by examiner

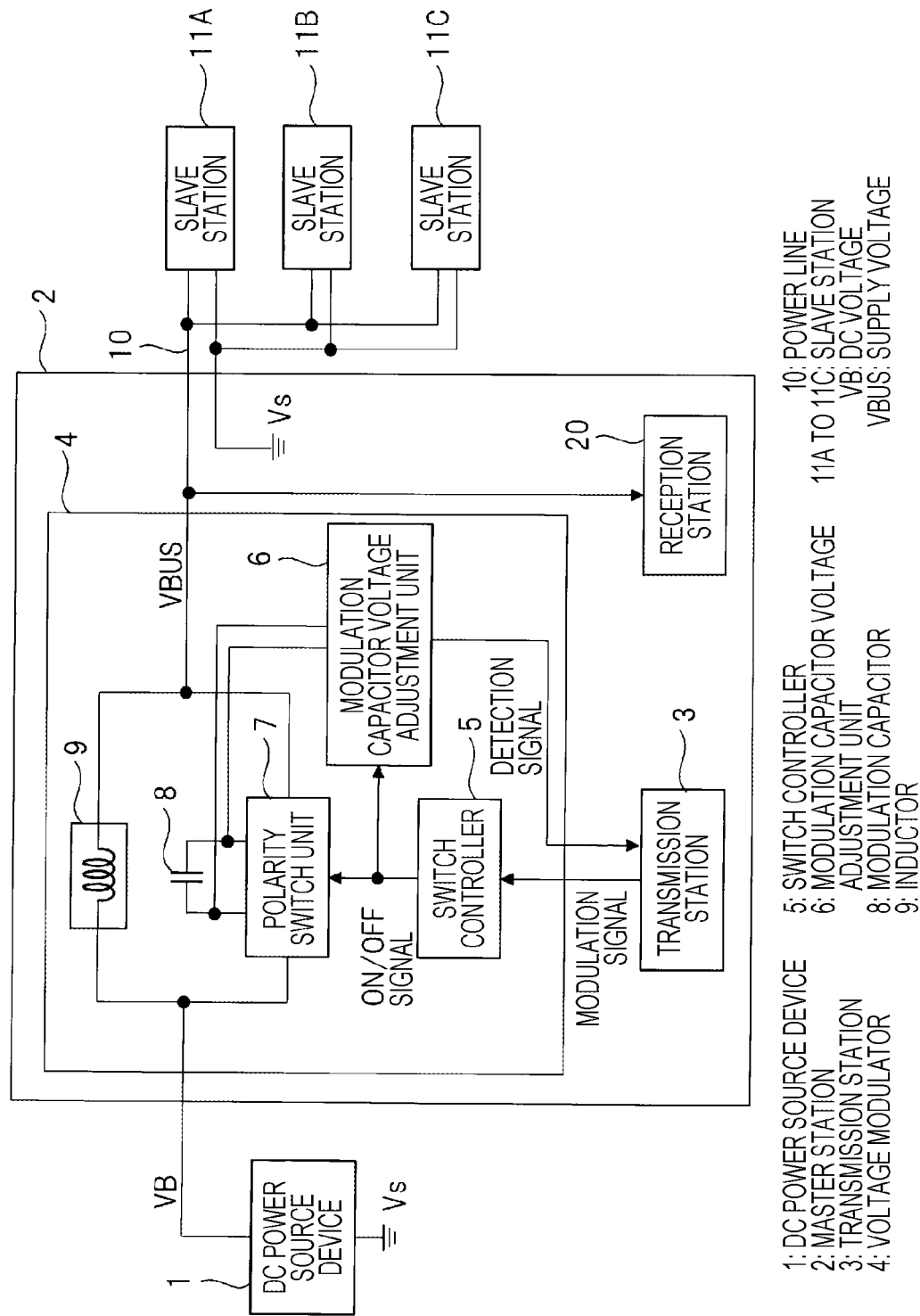

FIG. 6

| MODULATION | POLARITY SWITCH UNIT | | | | MODULATION CAPACITOR VOLTAGE ADJUSTMENT UNIT | | CHARGE/DISCHARGE |
|---|---|---|---|---|---|---|---|
| | SW1 | SW2 | SW3 | SW4 | SW68 | SW66 | |
| H | OFF | ON | ON | OFF | ON | OFF | DISCHARGE |
| L | ON | OFF | OFF | ON | OFF | ON | CHARGE |
| N/A | ON | ON | OFF | OFF | OFF | ON | CHARGE |

POWER LINE COMMUNICATION DEVICE, IN-VEHICLE DEVICE AND IN-VEHICLE SYSTEM

DEVICE AND IN-VEHICLE SYSTEM

Technical Field

The present invention relates to a power line communication device, an in-vehicle device, and an in-vehicle system, for example, a power line communication device mounted on a vehicle such as an automobile.

BACKGROUND ART

In recent years, in automobiles, with the increase in precision and functionality of vehicle control by an electronic control unit (Electronic Control Unit: hereinafter referred to as ECU), there are a number of sensors and actuators to acquire various vehicle information including peripheral information of the vehicle, and to control various parts of the vehicle. Along with this, the number of wires for electrically connecting sensors and actuators to the ECU has been significantly increased. When the number of wires increases, the manufacturing cost of the automobile increases, and furthermore, the fuel consumption deteriorates due to the increase in the vehicle weight. Therefore, it is required to reduce the number of wires by consolidating the wires.

Therefore, A method of performing 1:N (the number of sensors and actuators) power line communication is performed in communication standards such as DSI3 and PSI5, in which a communication circuit is provided on the sensor or the actuator, and the supply of the DC voltage for the power source to the plurality of sensors or actuators and the communication for the control with the communication circuit provided on the sensor or the actuator are integrated by a pair of wires. In power line communication between the ECU and the sensors and actuators, the ECU serves as a voltage source that supplies a DC voltage to the power line, and when data is transmitted from the ECU to the sensors and actuators, in some cases, the ECU superimposes a binary data signal voltage to the DC voltage, and outputs the signal to the power line. In this case, the superposition of the data signal voltage on the DC voltage supplied to the power line is performed by a voltage modulator, and an example thereof is described in PTL 1.

CITATION LIST

Patent Literature

PTL 1: JP 2017-507625 A

SUMMARY OF INVENTION

Technical Problem

In the technique described in PTL 1, the master station has an H-bridge circuit. The master station uses this H-bridge circuit to drive a pair of power lines configured by two power lines. When driving, a voltage signal is transmitted to a slave station having a load by switching the polarity of the voltage applied to the power line pair in accordance with the transmission data sequence. In this technology, all the current flowing in the power line passes through the H-bridge circuit. Therefore, when a large current load such as an actuator is connected to the power line, a large current flows through the switch element such as a MOSFET (field-effect transistor) that forms the H-bridge circuit.

In order to suppress the power loss in the master station, it is required that the on-resistance of the switch element of the H-bridge circuit be sufficiently reduced. In addition, at least four switch elements are required to form the H-bridge circuit. Since a switching element such as a MOSFET having a small on-resistance is expensive, there is a problem that the component cost increases.

An object of the invention is to provide a power line communication device capable of suppressing component cost with low loss.

The above and other objects and novel features of the invention will become apparent from the description of the present specification and the accompanying drawings.

Solution to Problem

The outline of typical aspects of the invention disclosed in the present application will be briefly described as follows.

A power line communication device according to one embodiment includes a power source, a power line, and a master station that modulates a supply voltage supplied to the power line according to transmission data to be transmitted. The master station includes a modulation capacitor precharged with the modulation amplitude voltage, a switch unit that determines a polarity of the modulation capacitor connected to the power line according to the transmission data, and an inductor connected between the power source and the power line.

Advantageous Effects of Invention

The effects obtained by typical aspects of the invention disclosed in the present application will be briefly described as follows.

It is possible to provide a power line communication device capable of suppressing component costs with low loss.

By switching the polarity of the modulation capacitor connected to the power line according to the transmission data, the modulation amplitude voltage charged in the modulation capacitor acts in the direction of increasing or decreasing the supply voltage according to the transmission data. Then, the supply voltage can be modulated according to the transmission data. Since the voltage acting on the supply voltage is the modulation amplitude voltage charged in the modulation capacitor, it is possible to reduce the loss. Further, since current is supplied to the power line via the inductor, a switching element having a relatively high on-resistance can be used for the switch unit. Therefore, it is possible to suppress the cost of parts.

BRIEF DESCRIPTION OF DRAWINGS

FIG. 1 is a block diagram illustrating a power line communication device according to a first embodiment.

FIG. 6 is a diagram illustrating a state of a switch according to the second embodiment.

DESCRIPTION OF EMBODIMENTS

Figure 2A:
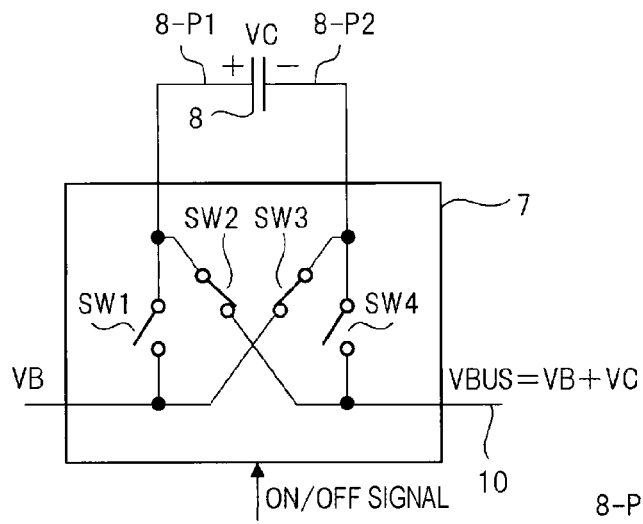
FIGS. 2A to 2C are diagrams for explaining the configuration and operation of a polarity switch unit according to the first embodiment.

Hereinafter, embodiments of the invention will be described on the basis of the drawings. Further, the same members in the drawings for describing the embodiments will be attached with the same symbol as a principle, and the redundant description will be omitted.

First Embodiment

<In-Vehicle System>

Figure 9:
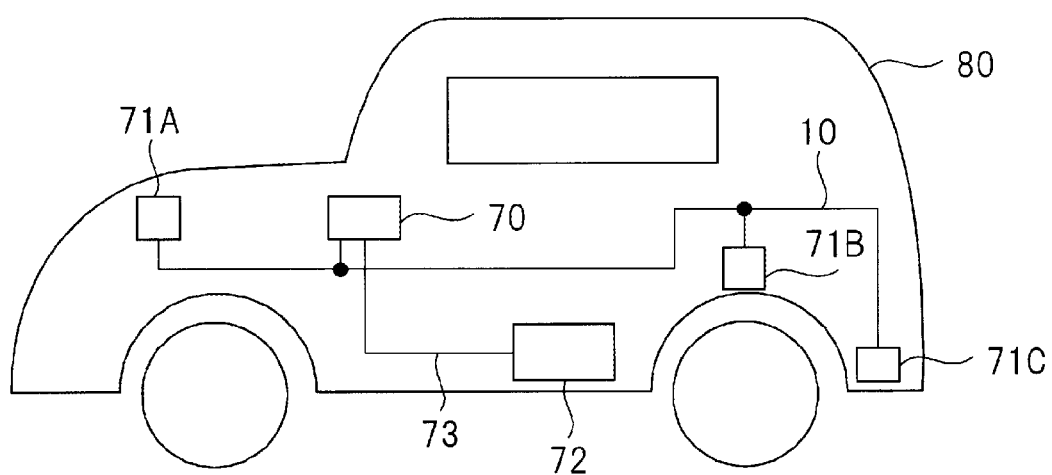
FIG. 9 is a diagram illustrating a configuration of an in-vehicle system according to the first embodiment.

First, an in-vehicle system will be described using an automobile as an example. FIG. 9 is a diagram illustrating a configuration of the in-vehicle system according to a first embodiment. In FIG. 9, reference numeral 70 denotes an ECU (in-vehicle device) mounted on an automobile 80, 71A to 71C denote actuators, and 72 denotes a battery. Although a large number of sensors and actuators are mounted on the automobile 80, FIG. 9 illustrates only three actuators 71A to 71C among these sensors as representatives. The battery 72 is connected to the ECU 70 by a power source line 73, and is a DC power source that supplies power to the ECU 70 using a battery voltage as a power source voltage.

The ECU 70 is connected to the actuators 71A to 71C by a power line 10. In the drawing, the power line 10 is drawn as one line, but is configured by a pair of two wires. The ECU 70 supplies a DC voltage supplied from the battery 72 to the actuators 71A to 71C via the power line 10. Although not particularly limited, the battery voltage of the battery 72 is stabilized by a power source voltage stabilizing device (not illustrated), and the ECU 70 supplies the stabilized DC voltage to the actuators 71A to 71C. The actuators 71A to 71C operate using the supplied DC voltage as a power source voltage.

In addition, communication is performed between the ECU 70 and the actuators 71A to 71C via the power line 10. That is, the connection between the ECU 70 and the actuators 71A to 71C uses a method generally called power line communication, in which voltage supply and communication are performed through the same power line 10. Each of the actuators 71A to 71C is provided with a communication circuit (not illustrated). Each communication circuit includes identification information for specifying each actuator.

When communicating with a specific actuator, the ECU 70 adds identification information of the specific actuator to transmission data and transmits the data to the power line 10. The actuators 71A to 71C determine, based on the identification information included in the data received via the power line 10, whether the data is transmission data addressed to the own station. In the case of the data addressed to the own station, the processing is performed based on the information. On the other hand, when it is determined that the data is not the data addressed to the own station, the actuators 71A to 71C ignore the received data. When the actuator transmits data, the communication circuit transmits the data to which the identification information is added to the power line 10. The ECU 70 specifies the actuator that transmitted the data based on the identification information included in the data received via the power line 10, and processes the received data.

In this embodiment, since a number of sensors and actuators are connected to one ECU 70 by the common power line 10, 1-to-N communication is performed. Transmission of data by the ECU 70 is performed by amplitude-modulating a supply voltage supplied to the power line 10 according to transmission data to be transmitted.

When the ECU 70, the sensors, and actuators are viewed from the viewpoint of communication, the ECU 70 corresponds to a master station, and the sensors and actuators 71A to 71C correspond to slave stations.

<Configuration of Master Station>

FIG. 1 is a block diagram illustrating a power line communication device according to the first embodiment. In FIG. 1, a DC power source device is indicated by 1, a master station is indicated by 2, and slave stations are indicated by 11A to 11C. Here, the correspondence between the power line communication device illustrated in FIG. 1 and the in-vehicle system illustrated in FIG. 9 will be described as follows. The DC power source device 1 includes the battery 72 illustrated in FIG. 9 and a power source voltage stabilizing device (not illustrated). The slave stations 11A to 11C indicate the actuators 71A to 71C (FIG. 9) provided with the communication circuit. The ECU 70 (FIG. 9) includes a communication unit related to data transmission/reception, modulation, and DC voltage supply, and a processing unit that executes various processes. In FIG. 1, the communication unit of the ECU 70 is illustrated as the master station 2.

The power line 10 configured by a pair of wires extends from one master station 2 as a starting point toward the slave stations 11A to 11C, and the power line 10 is connected to one master station 2 and a plurality of slave stations 11A to 11C.

The master station 2 is supplied with a DC voltage VB from the DC power source device 1 in order to supply power to the slave stations 11A to 11C through the power line 10. The master station 2 includes a transmission station 3, a voltage modulator 4, and a reception station 20. The transmission station 3 is supplied with data to be transmitted from a processing unit in the ECU 70, and the transmission station 3 outputs a modulation signal according to the data to be transmitted to the voltage modulator 4. The reception station 20 is connected to the power line 10, receives data transmitted via the power line 10, demodulates the data, and outputs data obtained by the demodulation to a processing unit (not illustrated).

The voltage modulator 4 supplies the power line 10 with a supply voltage VBUS based on the supplied DC voltage VB. The voltage modulator 4 binary-modulates the DC voltage VB based on a modulation signal from the transmission station 3, and outputs the result as the supply voltage VBUS. That is, the voltage modulator 4 outputs, as the supply voltage VBUS, a voltage modulated in a higher direction or a voltage modulated in a lower direction in accordance with the modulation signal with the supplied DC voltage VB as a center. When the voltage modulator 4 is not performing the modulation, the value of the supply voltage VBUS becomes the same as the value of the DC voltage VB. In this specification, the voltage difference between the voltage changed by the modulation and the DC voltage VB is referred to as a modulation amplitude voltage. One of the wires of the power line 10 is connected to a ground voltage Vs as illustrated in FIG. 1. Therefore, when modulation is performed, the voltage of the other wire of the power line 10 is the DC voltage VB+the modulation amplitude voltage or the DC voltage VB−the modulation amplitude voltage with reference to the ground voltage Vs.

Next, the configuration of the voltage modulator 4 will be described. The voltage modulator 4 includes a modulation capacitor 8, a modulation capacitor voltage adjustment unit 6 for stabilizing the voltage of the modulation capacitor 8, a polarity switch unit (switch unit) 7 for switching the polarity of the modulation capacitor 8 connected to the power line 10, a switch controller 5 for controlling the polarity switch unit 7 based on the modulation signal, and an inductor 9. The inductor 9 and the polarity switch unit 7 are connected in parallel between the power line 10 and the DC power source device 1. Therefore, a DC current flowing from the DC power source device 1 to the power line 10 can flow through the inductor 9 without passing through the polarity switch unit 7. That is, the inductor 9 functions as a bypass path through which a DC current flows.

The modulation of the supply voltage VBUS is realized by switching the polarity of the modulation capacitor 8, which is connected to the power line 10 and the DC power source device 1, by the polarity switch unit 7 when the modulation capacitor 8 precharged to the modulation amplitude voltage is connected between the DC power source device 1 and the power line 10. That is, when the modulation capacitor 8 charged to the modulation amplitude voltage is connected to the power line 10, the modulation is performed by determining the polarity of the modulation capacitor 8 connected to the power line 10 by the modulation signal.

<Configuration and Operation of Polarity Switch Unit>

FIG. 2 is a diagram for explaining the configuration and operation of the polarity switch unit according to the first embodiment. The polarity switch unit 7 includes a first switch SW1 to a fourth switch SW4. These switches SW1 to SW4 are switch-controlled by ON/OFF signals output from the switch controller 5 (FIG. 1).

When the transmission data to be transmitted has the logical value "1", the voltage modulator 4 outputs a voltage higher than the DC power source VB as the supply voltage VBUS, and when the logical value is "0", the voltage modulator 4 outputs the voltage lower than the DC voltage VB as the supply voltage VBUS. When the logical value is "1", the supply voltage VBUS output by the voltage modulator 4 is set to an H level, and when the logical value is "0", the output voltage VBUS output is set to an L level. The DC voltage VB is an intermediate voltage between the H level and the L level, and the voltage difference between the DC voltage VB and the H level is a modulation amplitude voltage. Similarly, the voltage difference between the DC voltage VB and the L level is also a modulation amplitude voltage. Hereinafter, a description will be given assuming that the symbol of the modulation amplitude voltage is VC.

Figure 2B:
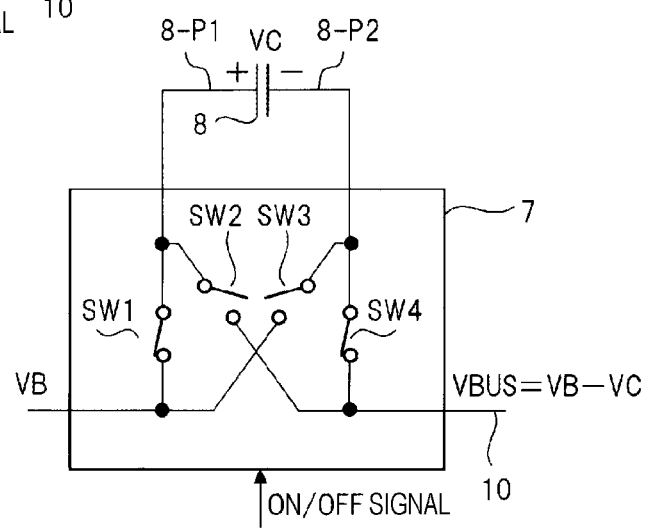
Figure 2C:
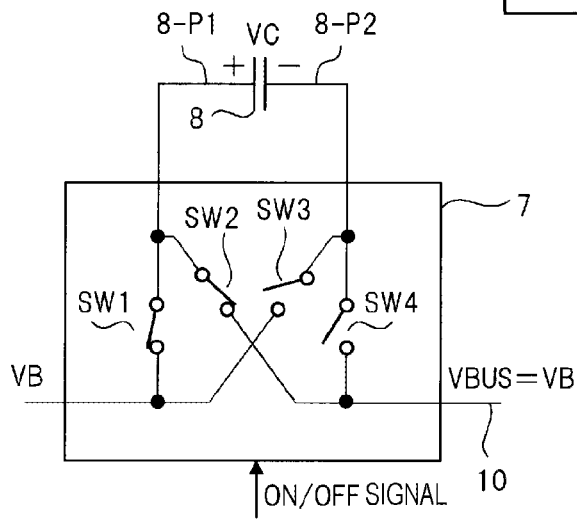

In FIG. 2, FIG. 2A illustrates a state where the voltage modulator 4 is outputting the H level, and FIG. 2B illustrates a state where the voltage modulator 4 is outputting the L level. FIG. 2C illustrates a state where the voltage modulator 4 is not performing modulation. In FIGS. 2A to 2C, the configuration of the polarity switch unit 7 is the same except for the states of the first switch SW1 to the fourth switch SW4. Therefore, the configuration of the polarity switch unit 7 will be described first with reference to FIG. 2A.

The first switch SW1 is connected between the DC power source device 1 and a first terminal 8-P1 of the modulation capacitor 8, and a second switch SW2 is connected to the first terminal 8-P1 of the modulation capacitor 8 and the power line 10. A third switch SW3 is connected between a second terminal 8-P2 of the modulation capacitor 8 and the DC power source device 1, and the fourth switch SW4 is connected between the second terminal 8-P2 of the modulation capacitor 8 and the power line 10. As described above, the first to fourth switches SW1 to SW4 are switch-controlled by the ON/OFF signal.

It is assumed that the modulation capacitor 8 is precharged by applying a positive modulation amplitude voltage VC to the first terminal 8-P1 with respect to the second terminal 8-P2. In this case, the first terminal 8-P1 of the modulation capacitor 8 is a terminal on the positive (+) side, and the second terminal 8-P2 is a terminal on the negative (−) side. Since the modulation capacitor 8 is charged with the modulation amplitude voltage VC, the modulation capacitor 8 holds the modulation amplitude voltage VC.

When transmitting the data of the logical value "1", the switch controller 5 turns on the second switch SW2 and the third switch SW3 by the ON/OFF signal as illustrated in FIG. 2A, and turns off the first switch SW1 and the fourth switch SW4. As a result, the second terminal 8-P2 of the modulation capacitor 8 is connected to the DC power source 1, and the first terminal 8-P1 of the modulation capacitor 8 is connected to the power line 10. That is, the positive (+) side terminal of the modulation capacitor 8 is connected to the power line 10, and the negative (−) side terminal is connected to the DC power source device 1. Since the modulation amplitude voltage VC is held in the modulation capacitor 8, the modulation amplitude voltage VC is added to the DC voltage VB, and the voltage modulator 4 supplies the supply voltage VBUS of VB+VC to the power line 10. As a result, the supply voltage VBUS of VB+VC is supplied to the slave stations 11A to 11C, and the logical value "1" of the transmission data is transmitted to the slave stations 11A to 11C.

On the other hand, when transmitting data of the logical value "0", the switch controller 5 turns on the first switch SW1 and the fourth switch SW4, and turns off the second switch SW2 and the third switch SW3 as illustrated in FIG. 2B. As a result, the first terminal 8-P1 of the modulation capacitor 8 is connected to the DC power source device 1, and the second terminal 8-P2 of the modulation capacitor 8 is connected to the power line 10. That is, the positive (+) side terminal of the modulation capacitor 8 is connected to the DC power source device 1, and the negative (−) side terminal is connected to the power line 10. Since the modulation amplitude voltage VC is held in the modulation capacitor 8, the modulation amplitude voltage VC is subtracted from the DC voltage VB, and the voltage modulator 4 supplies the supply voltage VBUS of VB−VC to the power line 10. As a result, the supply voltage VBUS of VB−VC is supplied to the slave stations 11A to 11C, and the logical value "0" of the transmission data is transmitted to the slave stations 11A to 11C.

When the voltage modulator 4 is not performing the amplitude modulation, the switch controller 5 sets the first switch SW1 to the fourth switch SW4 to the state illustrated in FIG. 2C by the ON/OFF signal. That is, the first switch SW1 and the second switch SW2 are turned on, and the third switch SW3 and the fourth switch SW4 are turned off. In this state, the first terminal 8-P1 of the modulation capacitor 8 is connected to the DC power source device 1 and the power line 10 by the first switch SW1 and the second switch SW2, and the second terminal 8-P2 of the modulation capacitor 8 is released.

As illustrated in FIG. 2C, by turning on the first switch SW1 and the second switch SW2, the DC power source device 1 and the power line 10 are electrically connected via the switch configured by the first switch SW1 and the second switch SW2. As illustrated in FIG. 1, the DC power source device 1 and the power line 10 are electrically connected by the inductor 9, but when the amplitude modulation is not performed, the switch configured by the first switch SW1 and the second switch SW2 is connected between the DC power source device 1 and the power line 10 in parallel with the inductor 9. As a result, the output impedance of the master station 2 with respect to the power line 10 can be reduced, and the supply voltage VBUS on the power line 10 can be stabilized with respect to load fluctuations of the slave stations 11A to 11C.

As described in FIGS. 2A and 2B, when the supply voltage VBUS on the power line 10 changes due to the amplitude modulation, the change may be transmitted to the DC power source device 1. However, at this time, since the inductor 9 connects between the DC power source device 1 and the power line 10, it is possible to reduce a change in the supply voltage VBUS from being transmitted to the DC power source device 1.

In the state illustrated in FIG. 2C, that is, when the amplitude modulation is not performed, the second terminal 8-P2 of the modulation capacitor 8 is released as described above. Therefore, when the amplitude modulation is not performed, the second terminal 8-P2 of the modulation capacitor 8 can be connected to an arbitrary node. For example, by connecting the second terminal 8-P2 to a node having a voltage (negative voltage) lower than the DC voltage VB, it is possible to perform charging such that the voltage held by the modulation capacitor 8 becomes the modulation amplitude voltage VC.

When the data changes from the logical value "1" (or "0") to the logical value "0" ("1"), the supply voltage on the power line 10 is transferred from the H (L) level to the L (H) level. In a case where this transition is steep and a problem is caused by a change in the supply voltage on the power line 10, the state as illustrated in FIG. 2C may be generated during the switching from the H (L) level to the L (H) level so that the voltage of the supply voltage VBUS changes in two stages.

Further, during data transmission, the switch controller 5 sets the first switch SW1 to the fourth switch SW4 to the state in which the amplitude modulation illustrated in FIG. 2C is not performed. Therefore, the supply voltage VBUS can be set to an intermediate voltage VB, in addition to the H level and L level, and the supply voltage VBUS may be modulated to a ternary value instead of a binary value by actively using this voltage level. That is, by allocating a new voltage state, which is the intermediate voltage VB between the H level and the L level, to the supply voltage VBUS as the logical value "2", it is possible to improve transmission rate in communication without increasing the modulation speed of the amplitude modulation.

The modulation capacitor voltage adjustment unit 6 is connected to the first terminal 8-P1 and the second terminal 8-P2 of the modulation capacitor 8, detects a holding voltage of the modulation capacitor 8, and supplies a detection signal to the transmission station 3. In addition, the holding voltage of the modulation capacitor 8 is stabilized. Although not particularly limited, the transmission station 3 outputs a modulation signal corresponding to data to be transmitted when a predetermined holding voltage held by the modulation capacitor 8 is notified by the detection signal. Since the modulation capacitor voltage adjustment unit 6 will be described in detail in a second embodiment, further description will be omitted here.

<Configuration of Slave Station>

Figure 3:
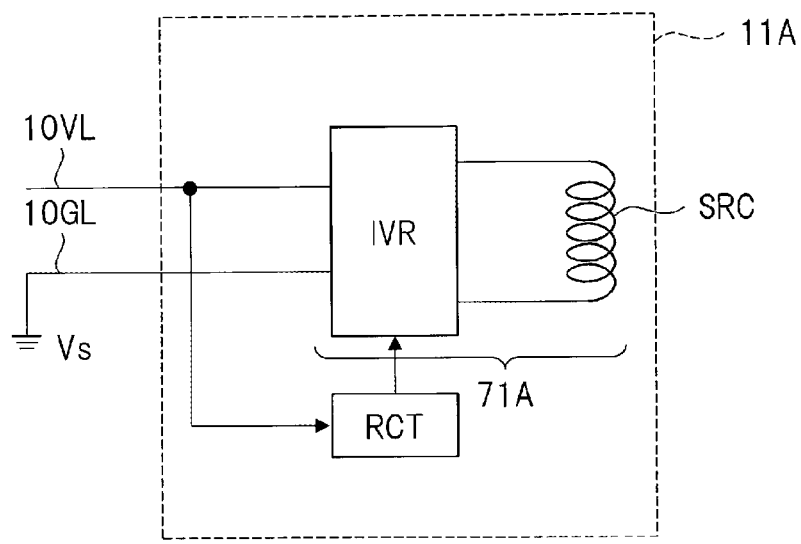
FIG. 3 is a block diagram illustrating a configuration of a slave station according to the first embodiment.

FIG. 3 is a block diagram illustrating a configuration of the slave station according to the first embodiment. The automobile 80 has a large number of slave stations (11A to 11C in FIG. 1). Here, the slave station 11A will be described as an example. The slave station 11A includes an actuator 71A (FIG. 9) and a communication circuit RCT provided in the actuator 71A.

In this embodiment, the actuator 71A includes the solenoid coil SRC and an inverter circuit IVR. The inverter circuit IVR is connected to the power line 10. In the drawing, a pair of wires of the power line 10 are drawn as 10VL and 10GL. The wire 10GL is connected to the ground voltage Vs in the master station 2, and the wire 10VL is connected to the voltage modulator 4 and the reception station 20 in the master station 2. The inverter circuit IVR converts the supply voltage VBUS on the power line 10 into an AC voltage, and applies the AC voltage to the solenoid coil SRC. Thereby, the solenoid coil SRC generates a magnetic field according to the applied AC voltage. For example, hydraulic pressure control is performed by the generated magnetic field.

The communication circuit RCT is connected to the wire 10VL on the power line 10 and the inverter circuit IVR. The communication circuit RCT detects a change in the amplitude of the supply voltage VBUS on the wire 10VL, and controls the inverter circuit IVR according to the detection result. The communication circuit RCT detects the amplitude of the supply voltage VBUS based on, for example, the DC voltage VB output from the DC power source device 1. Thereby, according to the transmission data from the master station 2, the communication circuit RCT in the slave station 11A controls the inverter circuit IVR and controls the operation of the solenoid coil SRC. The identification information of the slave station is held by the communication circuit RCT, and the communication circuit RCT determines whether the transmission data of the master station 2 is addressed to the own station.

When driving the solenoid coil SRC, the inverter circuit IVR requires a large current. Even when such a large current is supplied, the master station 2 is required to keep the supply voltage VBUS on the power line 10 stable. When a plurality of slave stations including the slave station having the solenoid coil SRC are connected to the power line 10, the master station 2 needs to supply a current of, for example, a maximum of 5 (A) to the power line 10. Even in such a case, it is required to keep the supply voltage VBUS stable.

In the case of a slave station equipped with a sensor, the slave station also includes a communication circuit RCT connected to the power line 10. In this case, the communication circuit RCT transmits the data acquired by the sensor to the master station 2 via the power line 10. Although not particularly limited, when data is transmitted from the slave station to the master station, the slave station performs current modulation according to the data to be transmitted, and transmits the data.

Although the solenoid coil for hydraulic control is illustrated as an example of using the solenoid coil SRC, the invention is not limited thereto. For example, the solenoid coil SRC may be a solenoid coil for automatic control of an automobile. As the sensor, for example, a speed sensor or the like can be considered.

<Operating Waveform>

Figure 4:
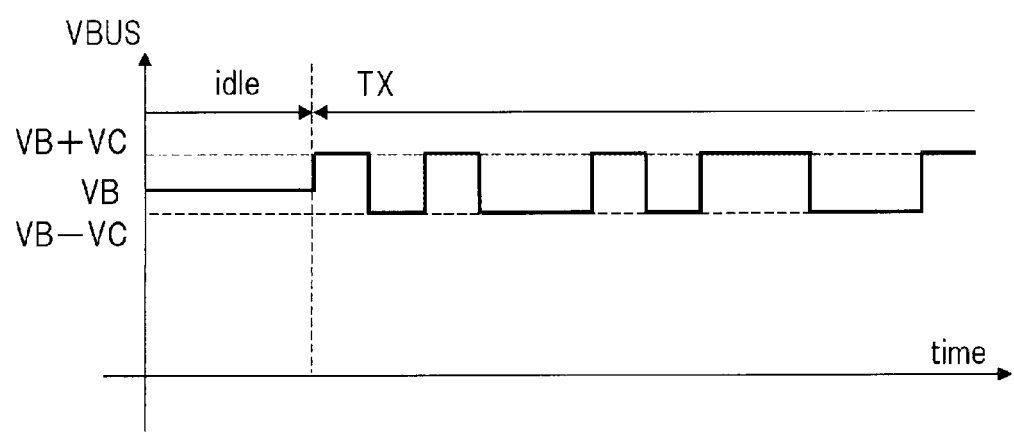
FIG. 4 is a waveform chart illustrating an operation of the power line communication device according to the first embodiment.

FIG. 4 is a waveform chart illustrating an operation of the power line communication device according to the first embodiment. In the drawing, a temporal change of the supply voltage VBUS on the power line 10 is illustrated. In FIG. 4, the horizontal axis represents time, and the vertical axis represents the voltage of the power line 10.

In FIG. 4, a transmission period, during which the master station 2 is transmitting data, is indicated by TX. In the transmission period TX, the transmission station 3 (FIG. 1) outputs a modulation signal according to data to be transmitted, and the switch controller 5 outputs an ON/OFF signal according to the modulation signal. As a result, the polarity switch unit 7 is brought into the state illustrated in FIG. 2A or 2B, and the supply voltage VBUS on the power line 10 is changed to the H level (VB+VC) or the L level (VB−VC) according to data to be transmitted.

On the other hand, in an idle period idle, the master station 2 does not transmit data. During the idle period idle, the switch controller 5 outputs an ON/OFF signal so that the polarity switch unit 7 is in the state illustrated in FIG. 2C. As a result, the supply voltage VBUS on the power line 10 becomes the same as the DC voltage VB output from the DC power source device 1. Although not particularly limited, the DC power source device 1 outputs 12 (V) as the DC voltage VB. The modulation amplitude voltage VC is, for example, 250 mV, and the voltage of the supply voltage VBUS on the power line 10 changes around 12 (V) according to the transmission data, and has a peak-to-peak of 500 (mV).

As described in <Configuration of Slave Station>, when driving the solenoid coil SRC, the master station 2 is required to supply a large current to the power line 10.

In the first embodiment, since the inductor 9 is connected between DC power source device 1 and the power line 10, the load current required by the slave station mainly flows through the inductor 9. Therefore, even if the on-resistance of the switches of the polarity switch unit 7 is relatively large, it is possible to suppress the loss in the polarity switch unit 7. Further, in the idle period idle, the first switch SW1 and the second switch SW2 in the polarity switch unit 7 form a current path that is connected in parallel with the inductor 9. As a result, in the idle period idle, the output impedance of the master station 2 can be reduced, and the supply voltage VBUS can be stabilized.

A resistor can be used instead of the inductor 9 in order to suppress a change in voltage according to the transmission data from being transmitted to the DC power source device 1. However, since the load current required by the slave station is large, the loss at the resistor may be large. Therefore, it is desirable to use the inductor 9 as illustrated in FIG. 1.

Further, as a configuration for changing the voltage of the power line according to the transmission data, a diode and a switch are connected in parallel between the DC power source device 1 and the power line 10, and the switch is turned on or off according to the transmission data. In this case, by turning the switch on or off, the voltage amplitude of the power line can be modulated by the forward voltage of the diode. However, since a large current flows through the diode during modulation, it is conceivable that the loss at the master station 2 increases and the heat radiation of the master station increases. In the ECU, the heat radiation restrictions are severe, so it is difficult to mount a master station that increases the heat radiation as an ECU. On the other hand, in this embodiment, the charge charged to the modulation capacitor 8 is used for modulation, so that the loss at the master station 2 can be reduced. Even when the load current is large, heat radiation can be suppressed, and the master station can be installed as an ECU.

Furthermore, since the current required by the slave station mainly flows through the inductor 9, each of the first switch SW1 to the fourth switch SW4 may have a relatively high on-resistance. As a result, inexpensive switches can be used as the first switch SW1 to the fourth switch SW4, and it is possible to suppress an increase in the cost of the components forming the master station 2.

FIG. 1 illustrates an example in which the polarity switch unit 7 is connected between the DC power source device 1 and the power line 10, but the polarity switch unit 7 may be connected between a voltage generation circuit different from the DC power source device 1 and the power line 10. In this case, the voltage generation circuit may supply the DC voltage VB to the polarity switch unit 7, similarly to the DC power source device 1. However, the provision of a new voltage generation circuit leads to an increase in cost, and the configuration illustrated in FIG. 1 is desirable.

Second Embodiment

In the first embodiment, the charging of the modulation capacitor 8 is performed during a period when transmission is not performed (for example, the idle period idle), but it is desirable that the charging be performed during the transmission period to stabilize the holding voltage of the modulation capacitor 8. In the voltage fluctuation during the transmission period TX (FIG. 4) and/or transmission during a long transmission period, for example, the charge held in the modulation capacitor 8 decreases, and the modulation amplitude voltage VC which is the holding voltage of the modulation capacitor 8 becomes unstable. Therefore, it is desirable to stabilize the holding voltage of the modulation capacitor 8 even during the transmission period.

Figure 5:
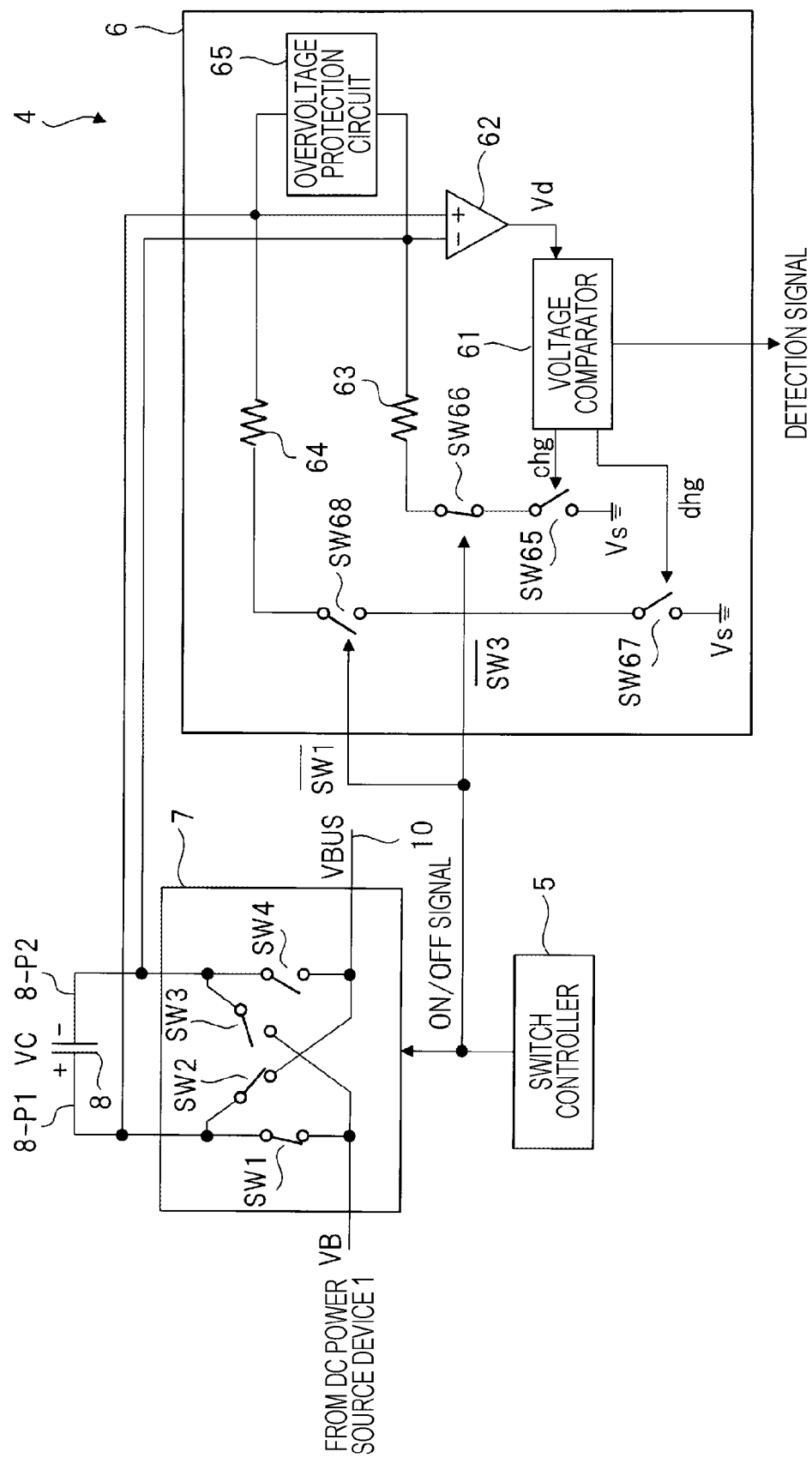
FIG. 5 is a block diagram illustrating a configuration of a main part of a master station according to a second embodiment.

The second embodiment provides a technique for stabilizing the holding voltage of the modulation capacitor 8 even during the transmission period. FIG. 5 is a block diagram illustrating a configuration of a main part of a master station according to the second embodiment. The configuration of the master station 2 according to the second embodiment is similar to the configuration of the master station illustrated in FIG. 1. In FIG. 5, unlike FIG. 1, the configuration of the modulation capacitor voltage adjustment unit 6 is illustrated in detail. Further, in FIG. 5, only the modulation capacitor 8, the polarity switch unit 7, the switch controller 5, and the modulation capacitor voltage adjustment unit 6 are illustrated in the configuration illustrated in FIG. 1, and other components are omitted.

The modulation capacitor 8, the polarity switch unit 7, and the switch controller 5 illustrated in FIG. 5 are the same as those in FIG. 1.

The modulation capacitor voltage adjustment unit 6 according to this embodiment includes fifth to eighth switches SW65 to SW68, resistors 63 and 64, a voltage comparator 61, a differential amplifier 62, and an overvoltage protection circuit 65. The negative input node (−) of the differential amplifier 62 is connected to the second terminal 8-P2 of the modulation capacitor 8, and the positive input node (+) is connected to the first terminal 8-P1 of the modulation capacitor 8. The resistor 63, the fifth switch SW65, and the sixth switch SW66 are connected in series between the negative input node (−) of the differential amplifier 62 and the ground voltage Vs, and the resistor 64, the seventh switch SW67, and the eighth switch SW68 are connected in series between the positive input node (+) of the differential amplifier 62 and the ground voltage Vs.

Since the fifth switch SW65 and the sixth switch SW66 are connected in series, it can be considered that these switches form a NAND circuit. Similarly, the seventh switch SW67 and the eighth switch SW68 connected in series can be considered as forming a NAND circuit.

The differential amplifier 62 amplifies the holding voltage of the modulation capacitor 8 which is a voltage difference between the first terminal 8-P1 and the second terminal 8-P2 of the modulation capacitor 8, and outputs the holding voltage Vd. The voltage comparator 61 compares the holding voltage Vd with a predetermined voltage. In this comparison, when the holding voltage Vd is higher than the predetermined voltage, the voltage comparator 61 outputs the discharge signal dhg, and when the holding voltage Vd is lower than the predetermined voltage, the voltage comparator 61 outputs the charge signal chg. Further, the voltage comparator 61 outputs a detection signal when the holding voltage Vd is equal to or higher than a predetermined voltage.

The fifth switch SW65 is controlled to be turned on or off by the charge signal chg, and the seventh switch SW67 is controlled to be turned on or off by the discharge signal dhg. That is, the fifth switch SW65 is turned on by the charge signal chg when the holding voltage Vd is lower than the predetermined voltage, and is turned off when the holding voltage Vd is higher than the predetermined voltage. Conversely, the seventh switch SW67 is turned on by the discharge signal dhg when the holding voltage Vd is higher than a predetermined voltage, and is turned off when the holding voltage Vd is lower than the predetermined voltage.

The sixth switch SW66 is controlled to be turned on or off in a manner complementary to the third switch SW3 in the polarity switch unit 7 by an ON/OFF signal (/SW3). Similarly, the eighth switch SW68 is controlled to be turned on or off in a manner complementary to the first switch SW1 in the polarity switch unit 7 by an ON/OFF signal (/SW1). That is, when the first switch SW1 and the third switch SW3 are turned on, the eighth switch SW68 and the sixth switch SW66 are turned off. On the other hand, when the first switch SW1 and the third switch SW3 are turned off, the eighth switch SW68 and the sixth switch SW66 are turned on. The ON/OFF signal (/SW1) indicates an ON/OFF signal that controls the first switch SW1 and is inverted in phase with respect to the ON/OFF signal (SW1) (not illustrated). Similarly, the ON/OFF signal (/SW3) indicates an ON/OFF signal that controls the third switch SW3 and is inverted in phase with respect to the ON/OFF signal (SW3) (not illustrated).

Accordingly, when the holding voltage Vd corresponding to the holding voltage of the modulation capacitor 8 is lower than the predetermined voltage, and when the third switch SW3 is turned off, the charge path connecting the second terminal 8-P2 and the ground voltage Vs is formed by the resistor 63, the fifth switch SW65, and the sixth switch SW66. At this time, since the voltage VB is supplied to the first terminal 8-P1 of the modulation capacitor 8, the modulation capacitor 8 is charged and the holding voltage increases.

On the other hand, when the holding voltage Vd corresponding to the holding voltage of the modulation capacitor 8 is higher than a predetermined voltage, and the first switch SW1 is turned off, a discharge path connecting the first terminal 8-P1 of the modulation capacitor 8 and the ground voltage Vs is formed by the resistor 64, the seventh switch SW67, and the eighth switch SW68. As a result, the modulation capacitor 8 is discharged, and the holding voltage decreases.

A charge path or a discharge path is formed by the value of the holding voltage Vd, and the holding voltage Vd becomes a predetermined voltage. That is, the holding voltage of the modulation capacitor 8 can be adjusted to a predetermined voltage. The resistors 63 and 64 are current limiting resistors that limit the current flowing through the charge path and the discharge path.

FIG. 6 is a diagram illustrating a state of a switch according to the second embodiment. The switch controller 5 outputs an ON/OFF signal according to the supplied modulation signal such that the states of the first switch SW1 to the fourth switch SW4, the sixth switch SW66, and the eighth switch SW68 become as illustrated in FIG. 6.

When modulating the supply voltage VBUS to the H level, the switch controller 5 outputs an ON/OFF signal to turn off the first switch SW1, the fourth switch SW4, and the sixth switch SW66, and to turn off the second switch SW2, the third switch SW3, and the eighth switch SW68. At this time, if the voltage comparator 61 outputs the discharge signal dhg, the modulation capacitor 8 is discharged.

When modulating the supply voltage VBUS to the L level, the switch controller 5 outputs an ON/OFF signal to turn on the first switch SW1, the fourth switch SW4, and the sixth switch SW66, and to turn on the second switch SW2, the third switch SW3, and the eighth switch SW68. At this time, if the voltage comparator 61 outputs the charge signal chg, the modulation capacitor 8 is charged.

On the other hand, when modulation is not performed (idle period idle), the switch controller 5 outputs an ON/OFF signal to turn on the first switch SW1, the second switch SW2, and the sixth switch SW66, and to turn on the third switch SW3, the fourth switch SW4, and the eighth switch SW68. At this time, if the voltage comparator 61 outputs the charge signal chg, the modulation capacitor 8 is charged.

That is, the charging of the modulation capacitor 8 is performed by drawing a current from the side terminal 8-P2 when the negative terminal 8-P2 of the modulation capacitor 8 is disconnected from the DC power source device 1, that is, when the third switch SW3 is turned off. On the other hand, the discharging of the modulation capacitor 8 is performed by drawing current from terminal 8-P1 when the positive terminal 8-P1 of the modulation capacitor 8 is disconnected from the DC power source device 1, that is, when the first switch SW1 is turned off.

As a result, not only during non-modulation but also during modulation, the charging or discharging of the modulation capacitor 8 is performed according to the holding voltage Vd, and the holding voltage of the modulation capacitor 8 is adjusted to a predetermined voltage. In this case, the predetermined voltage to be adjusted is the modulation amplitude voltage VC. By adjusting the holding voltage of the modulation capacitor 8, the holding voltage is stabilized. Since the holding voltage is adjusted to the modulation amplitude voltage VC, it is possible to stabilize the voltage amplitude that changes on the power line 10 according to the transmission data.

Further, since the holding voltage of the modulation capacitor 8 is adjusted to be the modulation amplitude voltage VC, it is possible to prevent the modulation capacitor 8 from exceeding the rated voltage. It is possible to perform the operation while keeping the rated voltage. If the operation is performed in excess of the rated voltage and the operation is in violation of the rated voltage, the modulation capacitor 8 will be destroyed and the reliability of communication using the power line will be impaired. Thus, it is important to perform the operation while keeping the rated voltage.

In this embodiment, the overvoltage protection circuit 65 is connected in parallel with the modulation capacitor 8. The overvoltage protection circuit 65 can protect the modulation capacitor 8 from an unexpected overvoltage when the power of the voltage modulator 4 is turned on. For example, if the amplitude of the supply voltage VBUS on the power line 10 is 500 (mV) at a peak-to-peak, the modulation amplitude voltage VC, which is the holding voltage of the modulation capacitor 8, is 250 (mV). Therefore, the overvoltage protection circuit 65 can be configured by connecting two diodes in parallel with opposite polarities. Even with such an overvoltage protection circuit 65 having a simple configuration, it is possible to protect the modulation capacitor 8 from a positive overvoltage and a negative overvoltage. According to this embodiment, it is possible to protect the modulation capacitor 8 against overvoltage when the power is turned on, and to keep the rated voltage of the modulation capacitor 8 during operation. Therefore, it is possible to suppress a decrease in communication reliability by providing the modulation capacitor 8.

FIG. 6 illustrates an example in which the resistors 63 and 64 are used to limit the current flowing through the charge path and the discharge path, but the invention is not limited thereto. For example, a constant current circuit configured by a transistor such as a MOSFET may be used instead of the resistor.

Further, in this embodiment, the transmission station 3 outputs a modulation signal when the detection signal indicates that the voltage held by the modulation capacitor 8 exceeds a predetermined voltage. Therefore, it is possible to prevent a voltage amplitude having an absolute value smaller than the modulation amplitude voltage VC from being transmitted to the power line 10, and highly reliable transmission is possible.

Although the voltage comparator 61 outputs the detection signal when the voltage held by the modulation capacitor 8 is equal to or higher than a predetermined voltage, the voltage comparator 61 may output the detection signal when the holding voltage is the modulation amplitude voltage VC.

The modulation capacitor voltage adjusting circuit 6 according to this embodiment can be regarded as including a capacitor voltage monitoring unit, a capacitor charging unit, and a capacitor discharging unit. In this case, the modulation capacitor voltage monitoring unit includes the differential amplifier 62 and the voltage comparator 61, and monitors the voltage between the terminals 8-P1 and 8-P2 of the modulation capacitor 8. The capacitor charging unit includes the resistor 63, the sixth switch SW66, and the fifth switch SW65, and when the voltage between the terminals 8-P1 and 8-P2 of the modulation capacitor 8 becomes smaller than a predetermined voltage, the negative electrode terminal 8-P2 the modulation capacitor 8 is connected to the ground voltage Vs (current load) to increase the voltage between the terminals. On the other hand, the capacitor discharging unit includes the resistor 64, the eighth switch SW68, and the seventh switch SW67, and when the voltage between the terminals 8-P1 and 8-P2 of the modulation capacitor 8 becomes larger than a predetermined voltage, the positive electrode terminal 8-P1 of the capacitor 8 is connected to the ground voltage Vs (current load) to reduce the voltage between the terminals.

Third Embodiment

As described in FIG. 6, the modulation capacitor voltage adjustment unit 6 can discharge the modulation capacitor 8 when modulating the supply voltage VBUS to the H level, and can charge the modulation capacitor 8 when modulating the supply voltage VBUS to the L level. In this case, the time during which the modulation capacitor 8 is charged or discharged depends on the time of the charge signal chg and the discharge signal dhg output from the voltage comparator 61 and the period during which the supply voltage VBUS is at the L level and the H level. That is, by adjusting not only the charge or discharge instruction (charge signal or discharge signal) for the modulation capacitor 8 by the modulation capacitor voltage adjustment unit 6, but also the period when the supply voltage VBUS is at the H level and the period when the supply voltage VBUS is at the L level, the adjustment can adjust the holding voltage of the modulation capacitor 8.

In other words, by extending the period during which the supply voltage VBUS is at the H level, the dischargeable period of the modulation capacitor 8 can be lengthened. By shortening the period at the H level, it is possible to shorten the discharge can be performed. Similarly, by extending the period during which the supply voltage VBUS is at the L level, the chargeable period of the modulation capacitor 8 is lengthened. By shortening the period at the L level, it is possible to shorten the chargeable period. Therefore, by adjusting the period of the H level and the period of the L level, the holding voltage of the modulation capacitor 8 can be adjusted.

In FIG. 5, current flows through the resistors 64 and 63 at the time of discharging and charging, and thus losses occur at the resistors 64 and 63. The holding voltage of the modulation capacitor 8 is adjusted by discharging or charging, but the loss in the resistors 64 and 63 may increase depending on the amount of change in the holding voltage at the time of adjustment, and heat generation may increase.

In this embodiment, the adjustment by the modulation capacitor voltage adjustment unit 6 described in the second embodiment and the adjustment of the H level period and the L level period of the supply voltage VBUS are combined. By combining these, the loss can be reduced.

Figure 7:
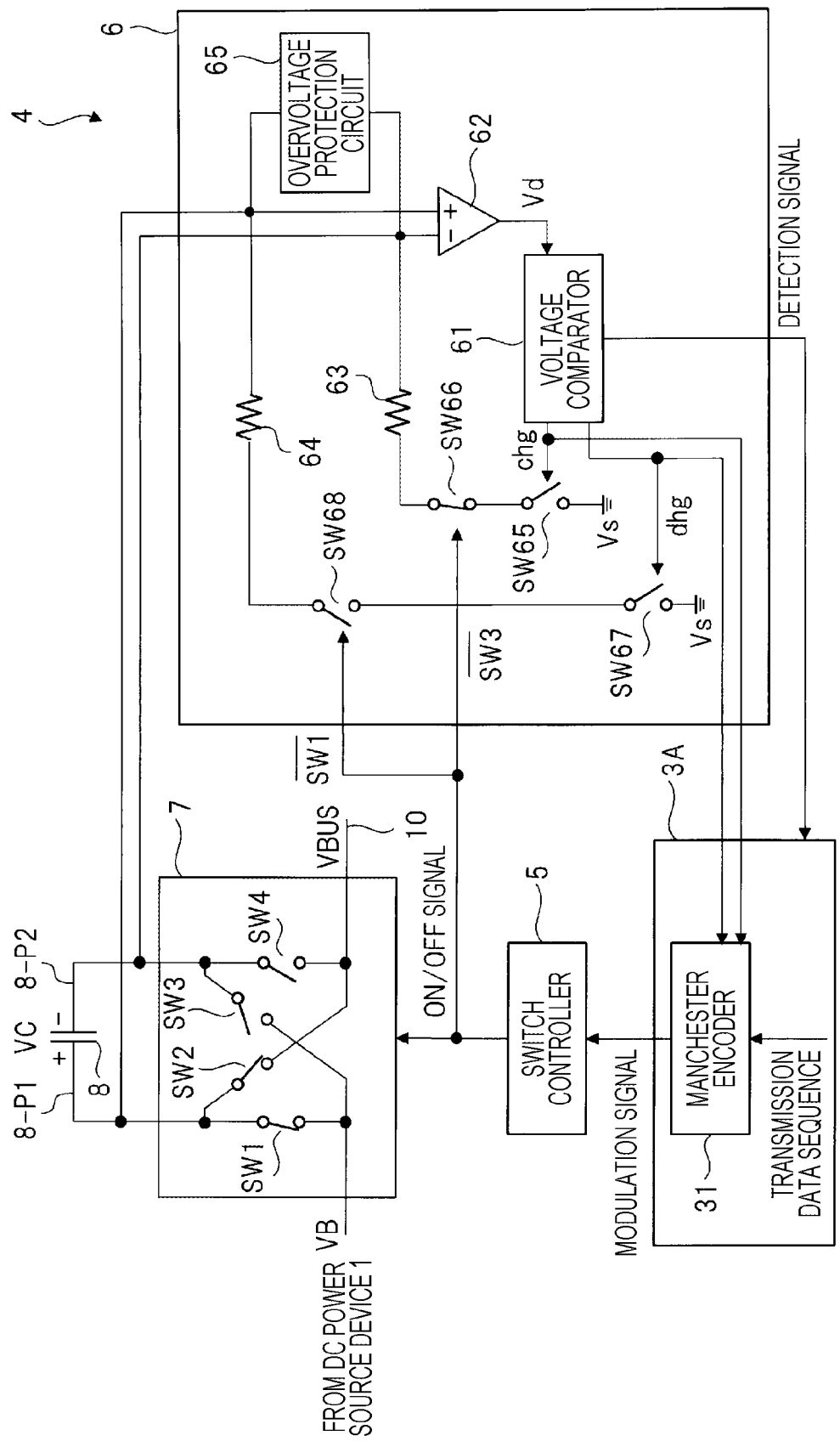
FIG. 7 is a block diagram illustrating a configuration of a main part of a master station according to a third embodiment.

FIG. 7 is a block diagram illustrating a configuration of a main part of a master station according to a third embodiment. FIG. 7 is similar to FIG. 5, and thus mainly different points will be described. The difference is that the transmission station 3 has been changed to be controlled by the charge signal chg and the discharge signal dhg, and has become a transmission station 3A.

In this embodiment, a Manchester encoder 31 is provided as a transmission line encoder in the transmission station 3A. The Manchester encoder 31 is supplied with a transmission data sequence to be transmitted, performs Manchester encoding on the transmission data sequence, and outputs a modulation signal corresponding to the transmission data sequence. In this embodiment, the Manchester encoder 31 is controlled by a charge signal chg and a discharge signal dhg. That is, the encoding format in the Manchester encoder 31 is dynamically changed by the charge signal chg and the discharge signal dhg.

In Manchester encoding, a logical value of transmission data is represented by a level change direction. For example, when the transmission data has the logical value "0", the supply voltage VBUS changes from the H level to the L level, and when the transmission data has the logical value "1", the supply voltage VBUS changes from the L level to the H level. Normally, in Manchester encoding, the H level period and the L level period are made equal so that the DC component becomes zero. However, in this embodiment, the H-level period and the L-level period are dynamically changed by the discharge signal dhg and the charge signal chg.

Figure 8:
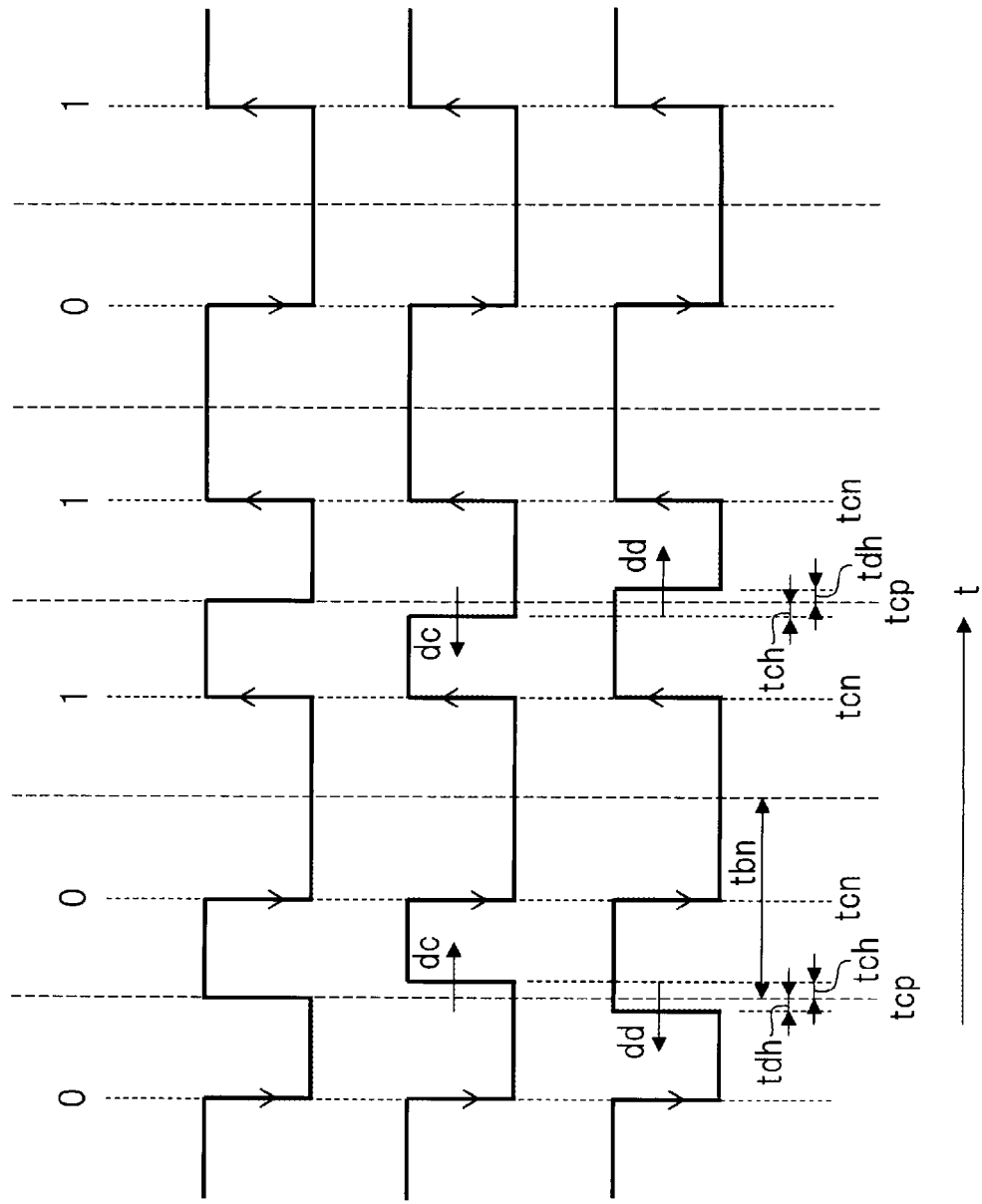
FIGS. 8A to 8D are diagrams illustrating the operation of the power line communication device according to the third embodiment.

FIG. 8 is a waveform chart illustrating an operation of the power line communication device according to the third embodiment. In the figure, the horizontal axis represents time, and the vertical axis represents voltage. FIG. 8A illustrates a transmission data sequence, and FIGS. 8B to 8D illustrate waveforms of a modulation signal output from the Manchester encoder 31 based on the transmission data sequence in FIG. 8A. The switch controller 5 outputs an ON/OFF signal in accordance with the modulation signals illustrated in FIGS. 8B to 8D, and the polarity switch unit 7 modulates the supply voltage VBUS. The voltage change of the supply voltage VBUS due to the modulation is similar to the voltage change of the modulation signal in FIGS. 8B to 8D.

In FIG. 8, a bit period of transmission data is indicated by tbn. The Manchester encoder 31 operates so that the modulation signal changes from the H level to the L level (or from the L level to the H level) in accordance with the logical value of the transmission data at a timing tcn that is a half of the bit period tbn.

FIG. 8B illustrates a case where charging and discharging operations are not performed on the modulation capacitor 8 during modulation. FIG. 8C illustrates a case where a charging operation is performed on the modulation capacitor 8 during modulation, and FIG. 8D illustrates a case where a discharging operation is performed on the modulation capacitor 8 during modulation. For distinction, FIG. 8B is referred to as a normal modulation signal, FIG. 8C is referred to as a charge modulation signal, and FIG. 8D is referred to as a discharge modulation signal for convenience.

When the charge and discharge of the modulation capacitor 8 are not notified by the charge signal chg and the discharge signal dhg, the Manchester encoder 31 outputs a modulation signal as illustrated in FIG. 8B. That is, a modulation signal is output such that the period of the modulation signal matches the bit period tbn.

On the other hand, when charge or discharge is notified by the charge signal chg or the discharge signal dhg, the Manchester encoder 31 changes the timing of changing the modulation signal. In this case, the change timing tcn of the modulation signal representing the logical value of the transmission data is maintained, and another change timing is changed. More specifically, the Manchester encoder 31 detects a case where transmission data having the same logical value continues, and changes the change timing of the modulation signal at the boundary of the bit period tbn.

Explaining with reference to FIG. 8, the Manchester encoder 31 detects a case where the logical value of the transmission data continues as "0" "0" or "1" "1". When detecting the continuation of the same logical value, the Manchester encoder 31 shifts a timing for changing from the L level to the H level or a timing for changing from the H level to the L level at the boundary tcp of the two bit periods tbn corresponding to the logical value. In FIG. 8, a change in the modulation signal with an arrow indicates a change representing a logical value of transmission data.

In the charging modulation signal illustrated in FIG. 8C, the rising and falling timings of the modulation signal are shifted in the direction indicated by the arrow dc such that the H level period becomes shorter and the L level period becomes longer. As a result, the rising of the modulation signal is delayed by the time tch with respect to the boundary tcp, and the falling of the modulation signal is earlier by the time tch. As a result, the period during which the supply voltage VBUS is at the L level becomes longer, and the time for charging the modulation capacitor 8 can be made longer.

On the other hand, in the discharge modulation signal illustrated in FIG. 8D, the rising and falling timings of the modulation signal are shifted in the direction indicated by the arrow dd such that the L level period becomes shorter and the H level period becomes longer. Thus, the rising of the modulation signal is earlier by the time tdh with respect to the boundary tcp, and the falling of the modulation signal is delayed by the time tdh. As a result, the period during which the supply voltage VBUS is at the H level becomes longer, and the time for discharging the modulation capacitor 8 can be made longer.

That is, whether the holding voltage of the modulation capacitor 8 is deviated from a predetermined voltage (modulation amplitude voltage VC) is notified to the Manchester encoder 31 by the charge signal chg and the discharge signal dhg. The Manchester encoder 31 changes the encoding format dynamically based on the notification.

The change timing of the modulation signal representing the logical value of the transmission data maintains the timing tcn which is half of the bit period tbn in both the modulation signal during charging and the modulation signal during discharging. Therefore, even if the encoding format is changed, the bit rate of the transmission data is not changed, and the ratio of the H level period and the L level period of the supply voltage VBUS is changed.

The switches described in the first to third embodiments are configured by, for example, MOSFETs. As described above, the load current of the master station 2 is mainly supplied to the slave station via the inductor 9. Therefore, even if a MOSFET having a relatively large on-resistance is used as the MOSFET constituting the switch, it is possible to suppress an increase in loss at the master station 2. Therefore, it is possible to suppress the heat radiation while suppressing the increase in the cost of the components of the master station.

As described above, the invention made by the inventor has been specifically described based on the embodiments. However, the invention is not limited to the embodiments, and various modifications can be made without departing from the spirit of the invention. For example, in FIG. 2C, when the modulation is not performed, the first switch SW1 and the second switch SW2 may be turned on, but the third switch SW3 and the fourth switch SW4 may be turned on. In this case, since the first terminal 8-P1 of the modulation capacitor 8 is released, it is possible to charge the modulation capacitor 8 by connecting the first terminal 8-P1 to a predetermined positive voltage.

REFERENCE SIGNS LIST

1 DC power source device
2 master station
3 transmission station
4 voltage modulator
5 switch controller
6 modulation capacitor voltage adjustment unit
8 modulation capacitor
9 inductor
10 power line
11A to 11C slave station
70 ECU
71A to 71C actuator
72 battery
80 automobile
SW1 to SW4, SW65 to SW68 first switch to eighth switch
VB DC voltage
VBUS supply voltage

The invention claimed is:

1. A power line communication device, comprising:
a power source;
a power line; and
a master station that modulates a supply voltage supplied to the power line according to transmission data to be transmitted,
wherein the master station includes
a modulation capacitor that is precharged with a modulation amplitude voltage,
a switch unit that determines a polarity of the modulation capacitor connected to the power line according to the transmission data, and
an inductor that is connected between the power source and the power line.

2. The power line communication device according to claim 1,
wherein the modulation capacitor is connected between the power source and the power line, and a polarity of the modulation capacitor connected to the power line is inverted by the switch unit.

3. The power line communication device according to claim 2,
wherein the inductor is connected in parallel with the modulation capacitor.

4. The power line communication device according to claim 3,
wherein the master station includes
a capacitor voltage monitoring unit that monitors a voltage between terminals of the modulation capacitor,
a capacitor charging unit that connects a current load to a negative terminal of the modulation capacitor when the voltage between the terminals is lower than a predetermined voltage, and increases the voltage between the terminals.

5. The power line communication device according to claim 4,
wherein the master station includes a capacitor discharging unit that connects a current load to a positive terminal of the modulation capacitor when the voltage between the terminals is higher than a predetermined voltage, and reduces the voltage between the terminals.

6. The power line communication device according to claim 5,
wherein the master station includes a transmission line encoder that changes an encoding format of the transmission data when the voltage between the terminals deviates from a predetermined voltage.

7. The power line communication device according to claim 3,
wherein a voltage of the power source and a voltage of the power line that is not modulated are the same.

8. An in-vehicle device for modulating a supply voltage supplied to a power line according to transmission data to be transmitted, the in-vehicle device comprising:
a modulation capacitor that is precharged with a modulation amplitude voltage;
a switch unit that determines a polarity of the modulation capacitor connected to the power line according to the transmission data; and
an inductor that is connected to the power line and supplies a predetermined voltage to the power line.

9. The in-vehicle device according to claim 8,
wherein the modulation capacitor is connected between a power source and the power line, and a polarity of the modulation capacitor connected to the power line is determined by the switch unit.

10. The in-vehicle device according to claim 9, further comprising:
a capacitor voltage monitoring unit that monitors a voltage between terminals of the modulation capacitor;
a capacitor charging unit that connects a negative electrode of the modulation capacitor to a current load, and charges the modulation capacitor when it is detected that the voltage between the terminals of the modulation capacitor is smaller than a predetermined voltage as a result of monitoring by the capacitor voltage monitoring unit; and
a capacitor discharging unit that connects a positive electrode of the modulation capacitor to a current load and discharges the modulation capacitor when it is detected that the voltage between the terminals of the modulation capacitor is greater than a predetermined voltage as a result of monitoring by the capacitor voltage monitoring unit.

11. The in-vehicle device according to claim 10,
wherein the inductor is connected between the power source and the power line,
wherein the switch unit includes a switch for electrically connecting the power source and the power line when the supply voltage is not modulated, and
wherein, when the supply voltage is not modulated, the switch and the inductor are connected in parallel between the power source and the power line.

12. An in-vehicle system, comprising:
a master station that modulates a supply voltage supplied from a power source according to transmission data to be transmitted; and
a plurality of slave stations that are connected to the master station by a power line,
wherein the master station includes
a modulation capacitor that is precharged with a modulation amplitude voltage,
a switch unit that determines a polarity of the modulation capacitor connected between the power source and the power line according to the transmission data, and
an inductor that is connected between the power source and the power line.

13. The in-vehicle system according to claim 12,
wherein the master station further includes
a capacitor voltage monitoring unit that monitors a voltage between terminals of the modulation capacitor,
a capacitor charging unit that connects a negative electrode of the modulation capacitor to a current load, and charges the modulation capacitor when it is detected that the voltage between the terminals of the modulation capacitor is smaller than a predetermined voltage as a result of monitoring by the capacitor voltage monitoring unit, and
a capacitor discharging unit that connects a positive electrode of the modulation capacitor to a current load and discharges the modulation capacitor when it is detected that the voltage between the terminals of the modulation capacitor is greater than a predetermined voltage as a result of monitoring by the capacitor voltage monitoring unit.

14. The in-vehicle system according to claim 13,
wherein the switch unit includes a switch for electrically connecting the power source and the power line when a supply voltage is not modulated, and
wherein, when the supply voltage is not modulated, the switch and the inductor are connected in parallel between the power source and the power line.

15. The in-vehicle system according to claim 14, wherein the plurality of slave stations include a coil driven based on the supply voltage of the power line, and a communication circuit that controls driving of the coil based on the transmission data.

\* \* \* \* \*